US012693826B2

(12) United States Patent (10) Patent No.: US 12,693,826 B2
Wang (45) Date of Patent: Jul. 28, 2026

(54) IMAGE DISPLAY METHOD, TERMINAL DEVICE, AND STORAGE MEDIUM

(71) Applicant: SPREADTRUM SEMICONDUCTOR (CHENGDU) CO., LTD., Chengdu (CN)

(72) Inventor: Zhiwei Wang, Chengdu (CN)

(73) Assignee: SPREADTRUM SEMICONDUCTOR (CHENGDU) CO., LTD., Chengdu (CN)

( * ) Notice: Subject to any disclaimer, the term of this patent is extended or adjusted under 35 U.S.C. 154(b) by 0 days.

(21) Appl. No.: 18/857,264

(22) PCT Filed: Apr. 14, 2023

(86) PCT No.: PCT/CN2023/088382
§ 371 (c)(1),
(2) Date: Oct. 16, 2024

(87) PCT Pub. No.: WO2023/198190
PCT Pub. Date: Oct. 19, 2023

(65) Prior Publication Data
US 2025/0272043 A1 Aug. 28, 2025

(30) Foreign Application Priority Data
Apr. 16, 2022 (CN) .......................... 202210398435.0

(51) Int. Cl.
*G06F 3/14* (2006.01)
*G06F 9/451* (2018.01)
(52) U.S. Cl.
CPC ............ *G06F 3/1431* (2013.01); *G06F 9/451* (2018.02)

(58) Field of Classification Search
CPC .. G06F 3/1446; G06F 3/04883; G06F 3/0346; G06F 3/147; G06F 2203/04803; G09G 2300/026; G09G 3/32
See application file for complete search history.

(56) References Cited

U.S. PATENT DOCUMENTS

2010/0082965 A1* 4/2010 Tsuji ..................... G06F 9/4401
713/2
2013/0155326 A1* 6/2013 Todoroki ................. H04N 5/45
348/565
(Continued)

FOREIGN PATENT DOCUMENTS

CN 104461427 A 3/2015
CN 110795009 A 2/2020
(Continued)

OTHER PUBLICATIONS

WIPO, International Search Report and Written Opinion for International Application No. PCT/CN2023/088382, Jun. 21, 2023.
(Continued)

*Primary Examiner* — Sujit Shah
(74) *Attorney, Agent, or Firm* — HAUPTMAN HAM, LLP

(57) ABSTRACT

An image display method and apparatus, a terminal device, and a storage medium are provided. The method includes the following. Corresponding initialization images are sent to multiple display screens according to an initial image in response to startup of a terminal device. Each display screen is controlled to simultaneously display a corresponding initialization image.

10 Claims, 7 Drawing Sheets

SEND CORRESPONDING INITIALIZATION IMAGES TO A PLURALITY OF DISPLAY SCREENS ACCORDING TO AN INITIAL IMAGE IN RESPONSE TO STARTUP OF A TERMINAL DEVICE, WHERE THE PLURALITY OF DISPLAY SCREENS ARE FROM AT LEAST TWO ELECTRONIC SYSTEMS — S101

CONTROL EACH DISPLAY SCREEN TO SIMULTANEOUSLY DISPLAY A CORRESPONDING INITIALIZATION IMAGE — S102

(56) References Cited

U.S. PATENT DOCUMENTS

| 2016/0098240 A1* | 4/2016 | Hong ................... G06F 3/1423 |
| | | 345/1.3 |
| 2019/0065133 A1* | 2/2019 | Liu ....................... G06F 3/1446 |
| 2022/0019398 A1* | 1/2022 | Cao ....................... G06F 3/1446 |
| 2022/0058030 A1 | 2/2022 | Dong et al. |

FOREIGN PATENT DOCUMENTS

| CN | 111273883 | A | 6/2020 |
| CN | 111459430 | A | 7/2020 |
| CN | 111639281 | A | 9/2020 |
| CN | 112579014 | A | 3/2021 |
| CN | 113029134 | A | 6/2021 |
| CN | 113645369 | A | 11/2021 |
| WO | 03054529 | A2 | 7/2003 |
| WO | 2005065166 | A2 | 7/2005 |
| WO | 2021193306 | A1 | 9/2021 |

OTHER PUBLICATIONS

First Office Action issued in corresponding CN application No. 202210398435.0 dated Mar. 14, 2025.
Notification of grant of patent right for invention issued in corresponding CN application No. 202210398435.0 dated Aug. 13, 2025.

* cited by examiner

IMAGE SEQUENCE

IMAGE DISPLAY METHOD, TERMINAL DEVICE, AND STORAGE MEDIUM

CROSS-REFERENCE TO RELATED DISCLOSURE(S)

The application is a National Stage of International Application No. PCT/CN2023/088382, field Apr. 14, 2023, which claims priority to Chinese Patent Application No. 202210398435.0, field Apr. 16, 2022, the entire disclosure of which are incorporated herein by reference.

TECHNICAL FIELD

This disclosure relates to the field of computers, in particular, to an image display method and apparatus, a terminal device, and a storage medium.

BACKGROUND

With the rapid development of science and technology, the integration level of terminal devices is increasing. Terminal devices can integrate multiple electronic systems. For example, a smart cockpit can integrate a powertrain system, a body control system, an instrument system, a central control system, an entertainment system, and the like.

Different electronic systems can include different display screens. For instance, the instrument system includes an instrument display, while the central control system includes a central control screen. Each electronic system may also have its own operating system, and the display screen of each electronic system can display an initialization image when the operating system of the electronic system starts up. However, if the operating systems of the electronic systems are different, startup durations of different operating systems of the electronic systems may vary. For example, the startup duration of a Linux-based operating system in the instrument system may differ from that of an Android-based operating system in the central control system. When the display screens of multiple electronic systems are triggered for display upon the startup of their respective operating systems, the display screens of multiple electronic systems cannot display the initialization images simultaneously. If the display screens of multiple electronic systems display simultaneously until the operating system with the longest startup duration starts up, the display of the initialization images on the display screens will be delayed. Therefore, how to quickly and simultaneously display the initialization images of multiple electronic systems on the terminal device is an urgent problem to be solved.

SUMMARY

In a first aspect, an image display method is provided. the method includes the following. Corresponding initialization images are sent to multiple display screens according to an initial image in response to startup of a terminal device, where the multiple display screens are from at least two electronic systems. Each display screen is controlled to simultaneously display a corresponding initialization image.

In a second aspect, a terminal device is provided in embodiments of the present disclosure. The terminal device includes a processor and a memory, and the processor is connected to the memory. The memory is configured to store a computer program, the computer program includes program instructions, and the processor is configured to invoke the program instructions to execute the image display method in the first aspect.

In a third aspect, a non-transitory computer-readable storage medium is provided in embodiments of the present disclosure. The computer-readable storage medium stores a computer program, the computer program includes program instructions which, when executed by a processor, cause the processor to execute the image display method in the first aspect.

BRIEF DESCRIPTION OF THE DRAWINGS

To provide a clearer understanding of embodiments or technical solutions in the present disclosure or the related art, the accompanying drawings will be briefly described below. It is evident that the accompanying drawings in the following description are merely some embodiments of the present disclosure. Based on these drawings, those of ordinary skill in the art can also obtain other drawings without creative effort.

DETAILED DESCRIPTION

Figure 1:
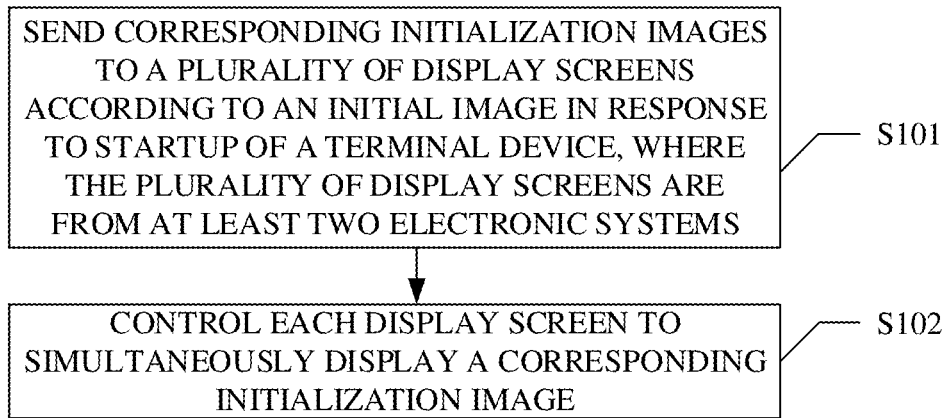
FIG. 1 is a schematic flowchart illustrating an image display method provided in embodiments of the present disclosure.

The technical solutions in embodiments of the disclosure will be clearly and completely described below with reference to the accompanying drawings in embodiments of the disclosure. Obviously, the described embodiments are only a part but not all of the embodiments of the disclosure. Based on the embodiments in the disclosure, all other embodiments obtained by those of ordinary skill in the art without creative efforts shall fall within the protection scope of the disclosure.

with the rapid advancement of science and technology, the integration level of terminal devices has increased significantly, allowing the terminal devices to incorporate multiple electronic systems. An electronic system refers to an electronic control system including an electronic control unit (ECU), sensors, microprocessor unit (MPU), dozens or even hundreds of electronic components, and software data. Electronic systems generally operate independently to achieve various functions. Terminal devices can include, but are not limited to, smartphones, tablets, wearable devices (like smartwatches and laptops), smart home systems, and intelligent cockpits. For example, when the terminal device is a smart home device, the smart home device may integrate security and entertainment systems. Similarly, when the terminal device is an intelligent cockpit, the intelligent cockpit can integrate powertrain systems, body control systems, dashboard systems, central control systems, and entertainment systems.

Each electronic system can include at least one display screen. For instance, a dashboard system might have an instrument display and a heads up display (HUD); the central control system can include a central display screen, a co-driver display, and rear passenger screens, and the like. Generally, terminal devices are required to display initialization images on the display screens of various electronic systems. In some cases, the display screen of each electronic system display screens its initialization image as its operating system boots up. However, since operating systems of electronic systems may be different, startup durations of operating systems of electronic systems may differ. For example, if the operating system of the dashboard system is Linux system and the operating system of the central control system is Android system, the startup durations for the Linux system and the Android system will vary. Consequently, when the display screens of multiple electronic systems are to display upon the startup of their respective operating systems, the display screens of multiple electronic systems cannot display initialization images at the same time. If the display screens of multiple electronic systems display simultaneously until the operating system with the longest startup duration starts up, the display of the initialization images on the display screens will be delayed. Therefore, how to quickly and simultaneously display the initialization images of multiple electronic systems on the terminal device is an urgent problem to be solved.

To address this, an image display method is provided in embodiments of the present disclosure. Upon startup of the terminal device, the terminal device distributes corresponding initialization images to multiple display screens from at least two electronic systems according to an initial image, and controls each display screen to simultaneously display a corresponding initialization image. This approach allows for the quick and simultaneous display of initialization images on multiple display screens of electronic systems, thereby enhancing user experience.

The detailed description of the image display method in embodiments of the present disclosure will be presented. Please refer to FIG. 1, which is a schematic a flowchart of the image display method provided in embodiments of the present disclosure. This method can be applied to a terminal device. As illustrated in FIG. 1, the image display method specifically includes operations at S101-S102.

At S101, when the terminal device starts up, corresponding initialization images are sent to multiple display screens according to an initial image. These multiple display screens are from at least two electronic systems.

When the terminal device is a smart cockpit, the startup of the terminal device refers to the startup of the smart cockpit. When the terminal device is a smart home, the startup of the terminal device refers to the startup of the smart home.

The initial image can be an independent frame or any frame in an image sequence. The initial image can also be an image sequence. The image sequence is a collection of multiple frames arranged in sequential order. For example, this image sequence can be an animated image, a video image, and so on.

The initial image in the disclosure can be captured by an image capture device, such as raw images. The initial image can also be user-generated images, which are not original but produced through secondary processing.

The resolution of the initial image can be any value. For example, the resolution of the initial image can be 600*800, 1920*1080, 3000*4000, and so on.

The initial image in the disclosure can be in any format, for example, it can be in bitmap (BMP), joint photographic experts group (JPEG), or portable network graphics (PNG) formats.

In one embodiment, when the initial image is pre-stored within the terminal device, the terminal device can directly obtain the pre-stored initial image. In another embodiment, when the initial image is pre-stored in a storage device, the terminal device can send an initial image request command to the storage device, and the storage device will respond to the initial image request command by returning the initial image, enabling the terminal device to obtain the initial image.

Furthermore, in order to save storage resources, the initial image can be stored in a compressed format. When the initial image in the compressed format is obtained, the initial image in the compressed format can be decompressed to obtain the initial image.

Each electronic system in the disclosure includes an operating system and at least one display screen. The operating system can be a real-time operating system (RTOS) system, Linux system, Android system, Windows system, Mac system, Chrome OS system, UNIX system, or a combination thereof. The display screen is configured to display images and includes a display panel. The display panel can be based on liquid crystal display (LCD), organic light-emitting diode (OLED), active-matrix organic light emitting diode (AMOLED), flexible light-emitting diode (FLED), quantum dot light emitting diodes (QLED), or a combination thereof.

The multiple display screens belong to at least two electronic systems. For example, the multiple display screens can include display screen A, display screen B, display screen C, and display screen D, which can come from at least two electronic systems. Optionally, the four mentioned display screens can come from four different electronic systems, such as display screen A from the first electronic system, display screen B from the second electronic system, display screen C from the third electronic system, and display screen D from the fourth electronic system. Alternatively, the four mentioned display screens can come from three electronic systems, such as display screen A from the first electronic system, display screen B from the second electronic system, and display screen C and display screen D from the third electronic system. Alternatively, the four mentioned display screens can come from two electronic systems, such as display screen A and display screen B from the first electronic system, and display screen C and display screen D from the second electronic system. These are just illustrative examples, and in specific scenarios, the mentioned display screens can be specific ones. For example, multiple display screens can include an instrument screen and a heads-up display (HUD) from the instrument system, as well as a central control screen and a passenger screen from the central control system.

In one embodiment, the terminal device sends corresponding initialization images to the multiple display screens according to the initial image as follows. An initialization image for each display screen is determined from the initial image and the initialization image corresponding is sent to each display screen to the respective display screen.

Optionally, the initial image can be an image sequence. The terminal device can determine the initialization image for each display screen from the image sequence and send the respective initialization image to each display screen separately.

Optionally, when there is a direct connection interface between the terminal device and each of the multiple display screen, the terminal device can send the respective initialization image to each display screen separately through the direct connection interface between the terminal device and each display screen.

It can be noted that the mentioned direct connection interface (such as the direct connection interface between the terminal device and each display screen or a reference direct connection interface between the terminal device and each display screen) can be of any type, including but not limited to digital-speech interpolation (DSI) interface, displayport (DP) interface, session initialization protocol (SIP) interface, low-voltage differential signaling (LVDS) interface, or a combination thereof.

Figure 2:
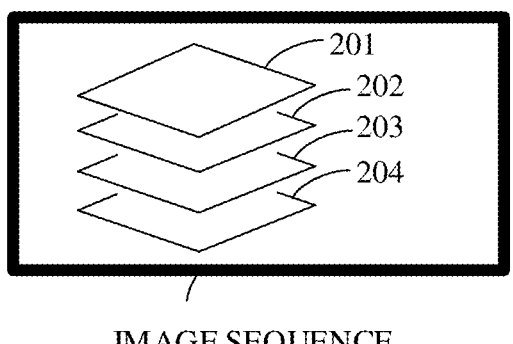
FIG. 2 is a schematic diagram of an image sequence provided in embodiments of the present disclosure.

Please refer to FIG. 2, which is a schematic diagram of an image sequence. Multiple display screens can include display screen A, display screen B, display screen C, and display screen D. As illustrated in FIG. 2, this image sequence may include the initialization image for display screen A (represented as 201 in FIG. 2), the initialization image for display screen B (represented as 202 in FIG. 2), the initialization image for display screen C (represented as 203 in FIG. 2), and the initialization image for display screen D (represented as 204 in FIG. 2). The terminal device can obtain the initialization image for display screen A, the initialization image for display screen B, the initialization image for display screen C, and the initialization image for display screen D from the image sequence. The terminal device can send the initialization image for display screen A to display screen A through the direct connection interface between the terminal device and display screen A, send the initialization image for display screen B to display screen B through the direct connection interface between the terminal device and display screen B, send the initialization image for display screen C to display screen C through the direct connection interface between the terminal device and display screen C, and send the initialization image for display screen D to display screen D through the direct connection interface between the terminal device and display screen D.

In another embodiment example, the terminal device sends the corresponding initialization images to multiple display screens according to the initial image as follows. The terminal device sends the initial image and separating the initial image to obtain the initialization image for each display screen.

Optionally, when there is a direct connection interface between the terminal device and the multiple display screens, the initial image can be sent through this direct connection interface, and the initial image can be separated to obtain the initialization image for each display screen.

Optionally, the terminal device separates the initial image to obtain the initialization image for each display screen as follows. The terminal device separates each frame in the initial image to obtain the initialization image for each display screen. Optionally, the terminal device may separate each frame in the initial image according to a preset separation rule to obtain the initialization image for each display screen. Optionally, the preset separation rule can be set according to a scenario requirement, a business requirement, or experience. For example, the preset separation rule can be determined according to the number of display screens. For instance, when the number of display screens is 2, the preset separation rule can be one or more of 1*2 or 2*1. Similarly, when the number of display screens is 4, the preset separation rule can be one or more of 1*4, 4*1, or 2*2. Furthermore, when the number of display screens is 5, the preset separation rule can be one or more of 1*5 or 5*1.

Optionally, the terminal device may use the preset separation rule for separating process according to a communication protocol. The communication protocol may include, but is not limited to, the flat panel display link (FPD-LINK) protocol.

Optionally, the terminal device may include an image separation unit. The terminal device can call the image separation unit to separate the initial image to obtain the initialization image for each display screen. The image separation unit may include, but is not limited to, a field programmable gate array (FPGA), among others.

Figure 3:
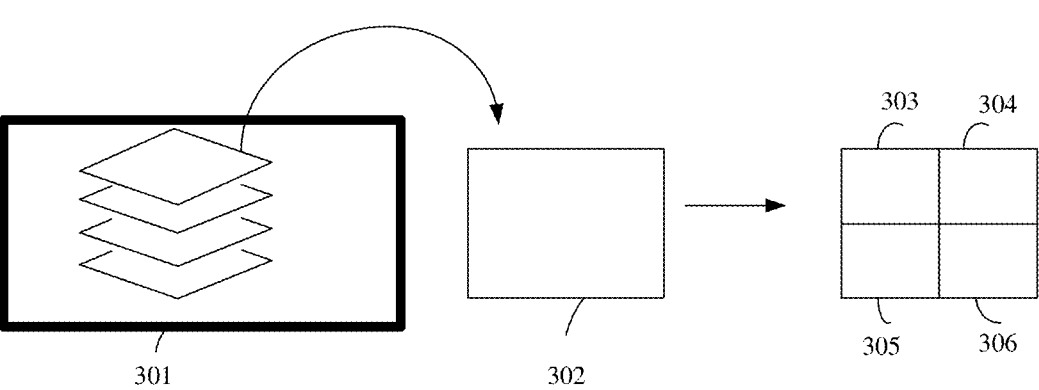
FIG. 3 is a schematic flowchart illustrating a separating process provided in embodiments of the present disclosure.

Please refer to FIG. 3, which a schematic flowchart illustrating a separating process. As illustrated in FIG. 3, the terminal device can separate the i-th frame (302) in the initial image (301) to obtain the i-th frame in the initialization image for each display screen. Here, i is a positive integer greater than or equal to 1. The terminal device extracts the image (302) from the initial image (301) and separates the i-th frame (302) according to a preset separation rule of 2*2 to obtain the i-th frame in the initialization image for display screen A (represented as 303 in FIG. 3), the i-th frame in the initialization image for display screen B (represented as 304 in FIG. 3), the i-th frame in the initialization image for display screen C (represented as 305 in FIG. 3), and the i-th frame in the initialization image for display screen D (represented as 306 in FIG. 3).

Optionally, when the i-th frame in the initial image is a complete image, the i-th frame included in the initialization image for each display screen may be an incomplete image. Therefore, the initialization image for each display screen may consist of incomplete images.

At S102, each display screen is controlled to simultaneously display a corresponding initialization image.

For example, when multiple display screens include display screen A, display screen B, display screen C, and display screen D, the terminal device can simultaneously control display screen A to display an initialization image for display screen A, control display screen B to display an initialization image for display screen B, control display screen C to display an initialization image for display screen C, and control display screen D to display an initialization image for display screen D.

In embodiments of the present disclosure, when the terminal device starts up, the terminal device can send corresponding initialization images to multiple display screens from at least two electronic systems according to the initial image. The terminal device can control each display screen to simultaneously display its corresponding initialization image. The operation of controlling multiple display screens to display initialization images is independent of the startup of operating systems and does not require waiting for the operating systems of the electronic systems to start before controlling the display screens to display the initialization images. When the terminal device starts up, the terminal device can promptly send corresponding initialization images to multiple display screens according to the initial image and control each display screen to simultaneously display its corresponding initialization image. This avoids the issue of display screens of different electronic systems displaying initialization images at different timing due to differences in the startup durations of their respective operating systems. Consequently, multiple display screens from two electronic systems can display initialization images simultaneously. Moreover, the aforementioned operations of sending corresponding initialization images to multiple display screens according to the initial image and controlling each display screen to simultaneously display a corresponding initialization image are performed during the startup of the terminal device, enabling fast display of initialization images.

Figure 4:
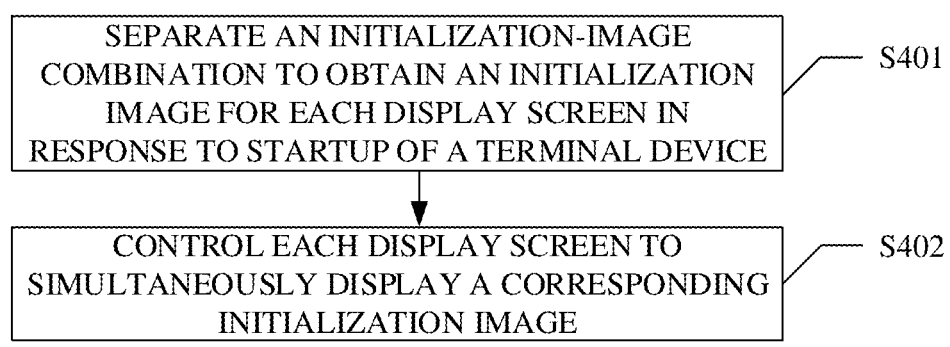
FIG. 4 is a schematic flowchart illustrating an image display method provided in other embodiments of the present disclosure.

Referring to the description of the method embodiment illustrated in FIG. 1, it can be understood that by means of the image display method illustrated in FIG. 1, the initialization images of multiple display screens from different electronic systems can be quickly and simultaneously displayed. In this method, the terminal device can send the initial image and separates the initial image to obtain the initialization image for each display screen. However, in this processing method, the initialization image for each display screen may be incomplete. To avoid incomplete images, the terminal device can first combine the complete initialization image for each display screen to obtain an initialization-image combination (where each frame in the initialization-image combination is a combination of complete images for multiple display screens). Then, the terminal device can separate each frame in the initialization-image combination to obtain the complete image for each display screen. Based on this, another image display method is provided in this embodiment. As illustrated in FIG. 4, this image display method may include the following operations.

At S401, when the terminal device starts up, the terminal device separates the initialization-image combination to obtain the initialization image for each display screen.

In one embodiment, when the initialization-image combination is pre-stored in the terminal device, the terminal device can directly obtain the pre-stored initialization-image combination. In another embodiment, when the initialization-image combination is pre-stored in a storage device, the terminal device can send an initialization-image combination request command to the storage device. The storage device responds to the initialization-image combination request command by returning the initialization-image combination, allowing the terminal device to obtain the initialization-image combination.

Figure 5A:
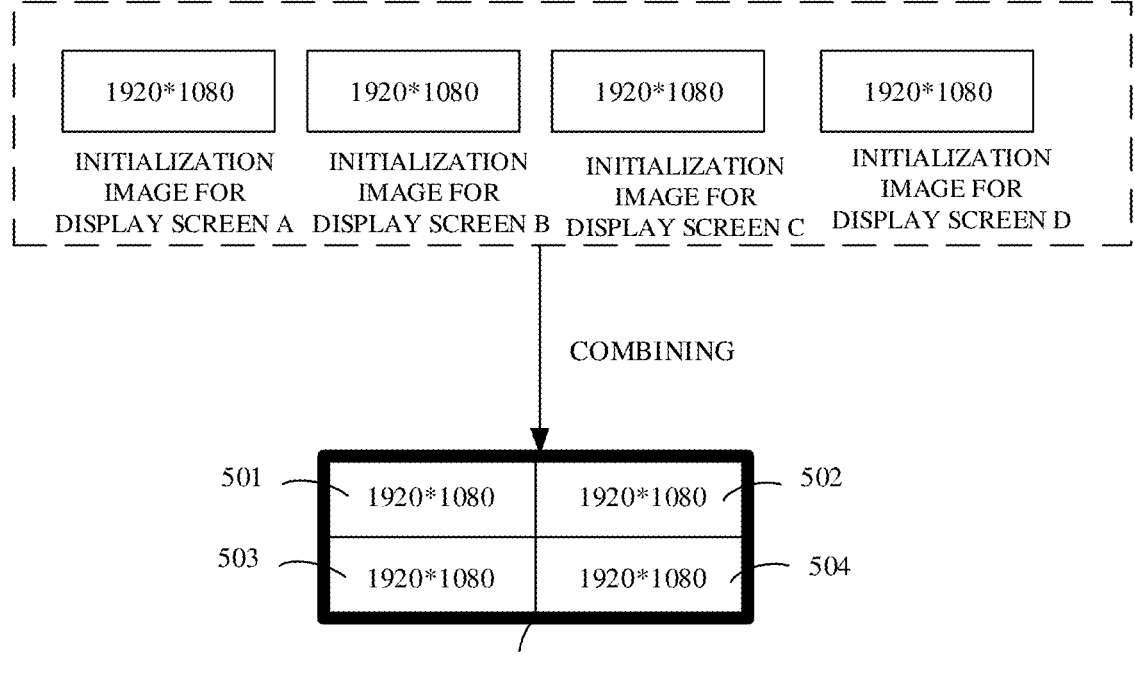
FIGS. 5A-5C are schematic flowcharts illustrating a combining process provided in embodiments of the present disclosure.

Before obtaining the initialization-image combination, the terminal device can also generate the initialization-image combination. In one embodiment, the terminal device can obtain the initialization image for each display screen and combine each initialization image to obtain the initialization-image combination. Optionally, to ensure that complete initialization images can be obtained after the initialization-image combination is separated, a preset splicing rule can be determined according to the preset separation rule (e.g., using the preset separation rule as the preset splicing rule), and the combination process can be performed according to the preset splicing rule to obtain the initialization-image combination. Assuming that there are multiple display screens, including display screen A, display screen B, display screen C, and display screen D. For illustrative purposes, the combination process for one frame is take as an example. Suppose that an initialization image for display screen A is one frame, an initialization image for display screen B is one frame, an initialization image for display screen C is one frame, and an initialization image for display screen D is one frame. The initialization-image combination obtained by combining the initialization image for display screen A, the initialization image for display screen B, the initialization image for display screen C, and the initialization image for display screen D includes one frame. When the initialization image for a display screen includes multiple frames, reference can be made to the relevant embodiment where the initialization image for a display screen is one frame. For example, the resolution of the initialization image for display screen A is 1920*1080, the resolution of the initialization image for display screen B is 1920*1080, the resolution of the initialization image for display screen C is 1920*1080, and the resolution of the initialization image for display screen D is 1920*1080. Please refer to FIG. 5A, which is a schematic flowchart illustrating a combining process. The terminal device combines the initialization image for display screen A, the initialization image for display screen B, the initialization image for display screen C, and the initialization image for display screen D according to a preset splicing rule of 2*2, resulting in an initialization-image combination with a resolution of 3840*2160. The initialization image for display screen A is located in the top-left corner of the initialization-image combination (represented as 501 in FIG. 5A), the initialization image for display screen B is located in the top-right corner of the initialization-image combination (represented as 502 in FIG. 5A), the initialization image for display screen C is located in the bottom-left corner of the initialization-image combination (represented as 503 in FIG. 5A), and the initialization image for display screen D is located in the bottom-right corner of the initialization-image combination (represented as 504 in FIG. 5A). It can be noted that the position of the initialization image for each display screen in the initialization-image combination can be set according to the business requirement or experience.

Figure 5B:
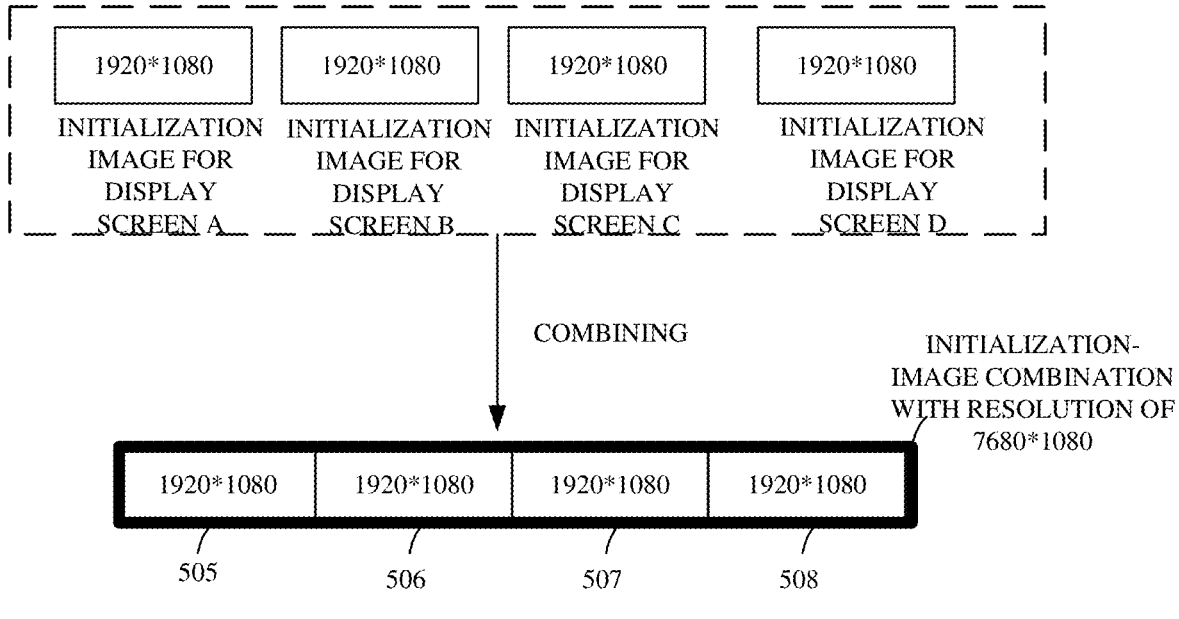

Please refer to FIG. 5B, which is schematic flowchart illustrating another combining process. According to a preset splicing rule of 1*4, the initialization image for display screen A, the initialization image for display screen B, the initialization image for display screen C, and the initialization image for display screen D are combined to obtain an initialization-image combination with a resolution of 7680*1080. The initialization image for display screen A is located in the first column of the initialization-image combination (represented as 505 in FIG. 5B), the initialization image for display screen B is located in the second column (represented as 506 in FIG. 5B), the initialization image for display screen C is located in the third column (represented as 507 in FIG. 5B), and the initialization image for display screen D is located in the fourth column (represented as 508 in FIG. 5B). It can be noted that the position of the initialization image for each display screen in the initialization-image combination can be set according to the business requirement or experience.

Figure 5C:
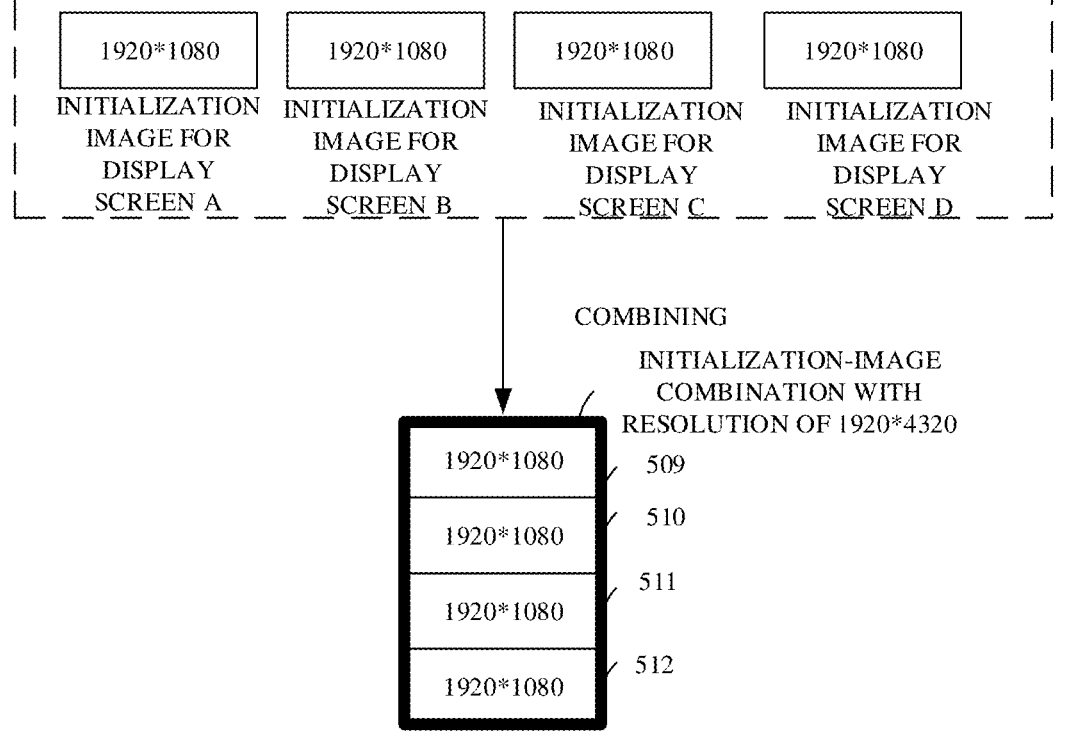

Please refer to FIG. 5C, which is a schematic flowchart of another combining process. When the initialization image for display screen A, the initialization image for display screen B, the initialization image for display screen C, and the initialization image for display screen D are combined according to a preset splicing rule of 4*1, an initialization-image combination with a resolution of 1920*4320 is obtained. The initialization image for display screen A is located in the first row of the initialization-image combination (represented as 509 in FIG. 5C), the initialization image for display screen B is located in the second row (represented as 510 in FIG. 5C), the initialization image for display screen C is located in the third row (represented as 511 in FIG. 5C), and the initialization image for display screen D is located in the fourth row (represented as 512 in FIG. 5C). It can be noted that the position of each display's initialization image in the initialization-image combination can be set according to the business requirement or experience.

The terminal device can have two states: offline state and startup state. The terminal device can combine the initialization image for each display in any state to obtain an initialization-image combination. Optionally, the terminal device can perform the combining process in the offline state to generate the initialization-image combination. Optionally, the terminal device can also perform the combining process in the startup state to generate the initialization-image combination.

Figure 6A:
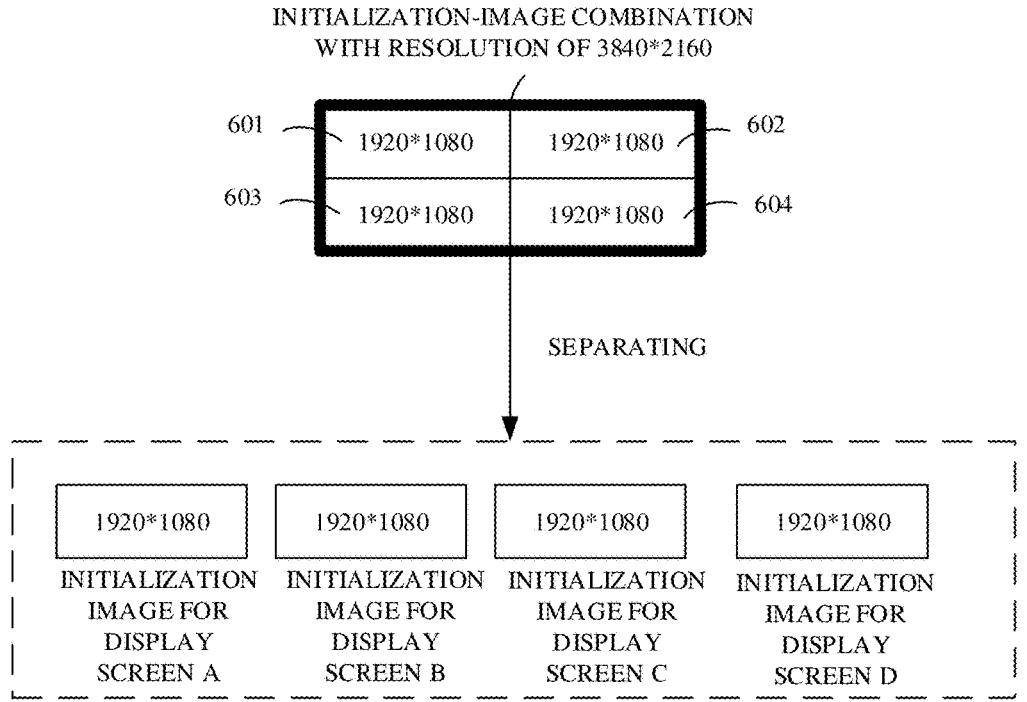
FIGS. 6A-6C are schematic flowcharts illustrating a separating process provided in other embodiments of the present disclosure.

In one embodiment, the terminal device can separate the initialization-image combination according to the preset separation rule to obtain the initialization image for each display screen. For example, refer to FIG. 5A and FIG. 6A together, FIG. 6A is a schematic flowchart illustrating a separating process. As illustrated in FIG. 6A, the terminal device can separate an initialization-image combination with a resolution of 3840*2160 by using a preset separation rule of 2*2. The initialization image for display screen A is obtained from the top left of the initialization-image combination (represented as 601 in FIG. 6A), the initialization image for display screen B is obtained from the top right (represented as 602 in FIG. 6A), the initialization image for display screen C is obtained from the bottom left (represented as 603 in FIG. 6A), and the initialization image for display screen D is obtained from the bottom right (represented as 604 in FIG. 6A).

Figure 6B:
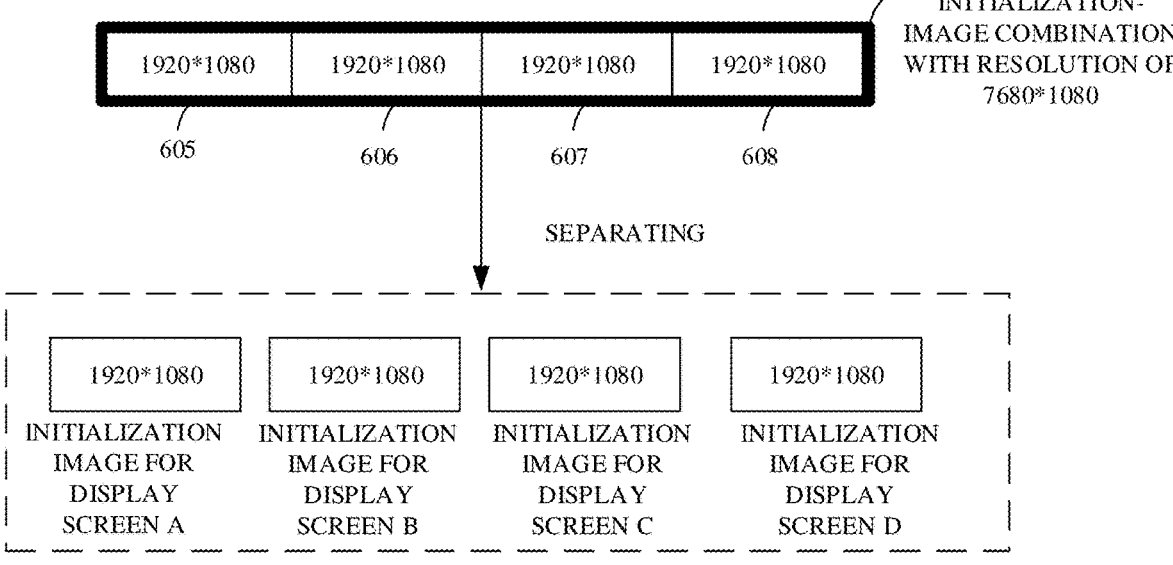

Please refer to FIG. 5B and FIG. 6B together, where FIG. 6B is a schematic flowchart illustrating another separating process. As illustrated in FIG. 6B, the terminal device can separate an initialization-image combination with a resolution of 7680*1080 by using a preset separation rule of 1*4. The initialization image for display screen A is obtained from the first column of the initialization-image combination represented as 605 in FIG. 6B), the initialization image for display screen B is obtained from the second column (represented as 606 in FIG. 6B), the initialization image for display screen C is obtained from the third column (represented as 607 in FIG. 6B), and the initialization image for display screen D is obtained from the fourth column (represented as 608 in FIG. 6B).

Figure 6C:
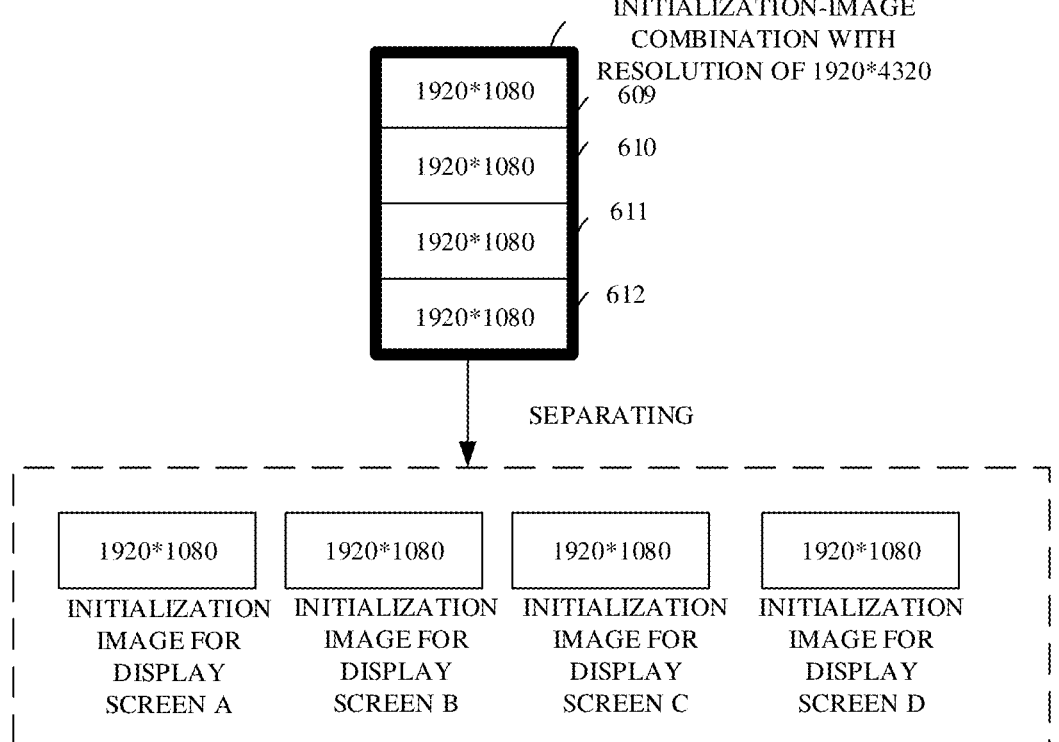

Please refer to FIG. 5C and FIG. 6C together, where FIG. 6C is a schematic flowchart illustrating another separating process. As illustrated in FIG. 6C, the terminal device can separate an initialization-image combination with a resolution of 1920*4320 by using a preset separation rule of 4*1. The initialization image for display screen A is obtained from the first row of the initialization-image combination (represented as 609 in FIG. 6C), the initialization image for display screen B is obtained from the second row (represented as 610 in FIG. 6C), the initialization image for display screen C is obtained from the third row (represented as 611 in FIG. 6C), and the initialization image for display screen D is obtained from the fourth row (represented as 612 in FIG. 6C).

Optionally, when there are at least two display screens of the same electronic system among the multiple display screens, the initialization images for the at least two display screens can be serialized to obtain the initialization image for the electronic system. For example, when the multiple display screens include display screen A, display screen B, display screen C, and display screen D, display screens A and B belong to the first electronic system, while display screens C and D belong to the second electronic system. The terminal device can serialize the initialization image for display screen A and the initialization image for display screen B to obtain the initialization image for the first electronic system, and also serialize the initialization image for display screen C and the initialization image for display screen D to obtain the initialization image for the second electronic system.

At S402, each display screen is controlled to simultaneously display a corresponding initialization image.

Optionally, when the terminal device obtains the initialization image for the electronic system, the terminal device can de-serialize the initialization image for each electronic system to obtain the initialization image for each display screen of the electronic system and control each display screen of the electronic system to display the corresponding initialization image. Continuing the example in S401, when display screen A and display screen B belong to the first electronic system and display screen C and display screen D belong to the second electronic system, the terminal device can de-serialize the initialization image for the first electronic system to obtain the initialization image for display screen A and the initialization image for display screen B, and similarly de-serialize the initialization image for the second electronic system to obtain the initialization image for display screen C and the initialization image for display screen D. The terminal device then simultaneously controls display screen A to display the initialization image for display screen A, display screen B to display the initialization image for display screen B, display screen C to display the initialization image for display screen C, and display screen D to display the initialization image for display screen D.

Furthermore, the terminal device displays an application interface image on the display screen. The following specifically uses the first electronic system as an example for illustration. Specifically, the at least two electronic systems includes the first electronic system, and the first electronic system includes a first operating system and at least one first display screen. The multiple display screens mentioned earlier includes the at least one first display. The terminal device displays an application interface image on the first display screen as follows.

At S11, when the first operating system starts up, an application interface image for each first display screen is obtained.

In one embodiment, the terminal device can start the first operating system in response to a startup operation for the first operating system. Optionally, when the terminal device receives a startup operation for the first operating system, the terminal device determines that the startup operation for the first operating system is detected. For example, when the first electronic system is an instrument system, if the user activates the operating system of the instrument system, the terminal device determines that the startup operation for the first operating system is detected and starts the first operating system. Optionally, the terminal device may start various operating systems automatically. For instance, when the terminal device distributes corresponding initialization images to the multiple display screens according to the initial image, the terminal device can determine that the startup operations for various operating systems are detected and control to start the operating systems of various electronic system. The various operating systems include the first operating system. In this case, the terminal device can automatically start multiple operating systems simultaneously.

Each electronic system can include an image storage module. In one embodiment, when the first operating system of the first electronic system starts up, the terminal device can obtain the application interface image for each first display from the image storage module of the first electronic system. For example, when the first electronic system is an instrument system that includes display screen A and display screen B, the terminal device can obtain the application interface image for display screen A and the application interface image for display screen B from the image storage module of the instrument system.

In another embodiment, the terminal device can also obtain the application interface image for each first display from an application-interface-image combination. Specifically, the terminal device can obtain the application-interface-image combination and separate the application-interface-image combination to obtain a corresponding application interface image for each display screen, and determining the application interface image for each first display from the application interface image for each display screen. It can be noted that for specific implementation of the terminal device calling the image separation unit to separate the application-interface-image combination, reference can be made to the relevant embodiments at S401, where the terminal device separates the initialization-image combination to obtain the initialization image for each display screen, which will not be described in detail herein.

Further, before the terminal device obtains the application-interface-image combination, the terminal device needs to combine an application interface image for each display screen to obtain the application-interface-image combination. For specific details, please refer to the relevant embodiment at S401, which will not be elaborated on herein.

At S12, each first display screen is controlled to display a corresponding application interface image.

In one embodiment, the terminal device can mix an application interface image of each display screen with an initialization image of the display screen and control the display screen to display a corresponding application interface image. In other words, for each display screen, the terminal device places the application interface image after the initialization image. The terminal device controls the display screen to display the corresponding application interface image after displaying the corresponding initialization image. The display screens include the first display screen. For example, when the first display screen includes display screen A, the terminal device can first control display screen A to display the initialization image for display screen A, and then control display screen A to display the application interface image for display screen A. The terminal device can use one or more of a graphics processing unit (GPU) or a central processing unit (CPU) for the mixing process.

In one embodiment, the terminal device can include a system display module. The terminal device can invoke the system display module to execute the image display method illustrated in FIG. 1 or FIG. 4. The system display module can belong to any one of at least two electronic systems, for example, the system display module belong to the first electronic system. Alternatively, the system display module can be a module independent of the multiple electronic systems. The system display module can be in the system on chip (SOC) of the terminal device or at another location within the terminal device, which is not limited herein.

Figure 7:
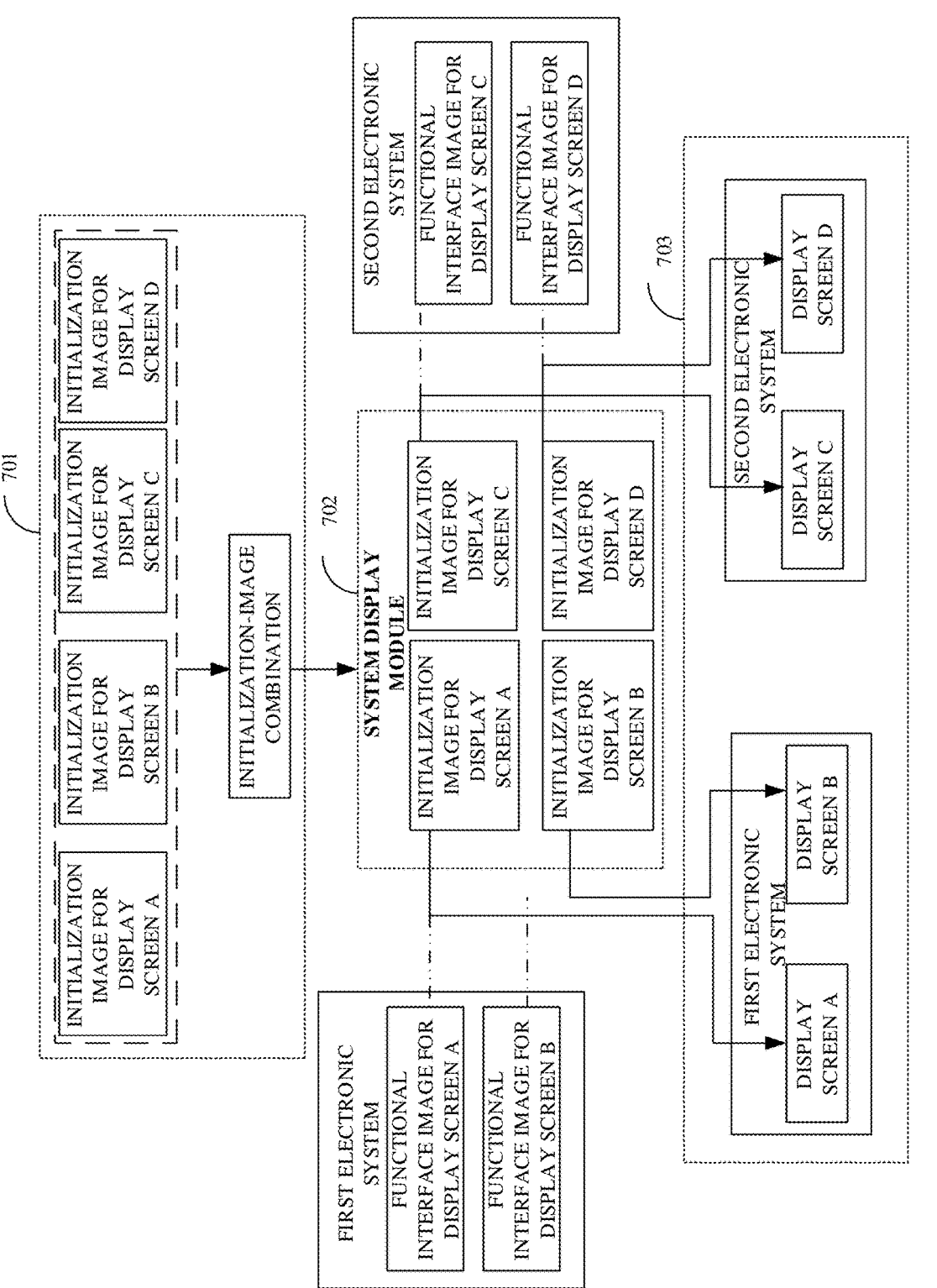
FIG. 7 is a schematic flowchart illustrating an image display method provided in other embodiments of the present disclosure.

Please refer to FIG. 7, which a schematic flowchart illustrating an image display method. As illustrated in FIG. 7, the at least two electronic systems include the first electronic system and the second electronic system. The first electronic system includes display screen A and display screen B, while the second electronic system includes display screen C and display screen D.

At 701, an initialization image for display screen A, an initialization image for display screen B, an initialization image for display screen C, and an initialization image for display screen D are obtained. The initialization image for display screen A, the initialization image for display screen B, the initialization image for display screen C, and the initialization image for display screen D are combined to obtain an initialization-image combination.

At 702, When the terminal device starts up, the system display module can separate the initialization-image combination into the initialization image for display screen A, the initialization image for display screen B, the initialization image for display screen C, and the initialization image for display screen D. Simultaneously, the terminal device controls display screen A to display the initialization image for display screen A, display screen B to display the initialization image for display screen B, display screen C to display the initialization image for display screen C, and display screen D display the initialization image for display screen D.

At 703, when the operating system of the first electronic system starts up, the initialization image for display screen A is mixed with the application interface image for display screen A, and display screen A is control to the initialization image for display screen A and the application interface image for display screen A. Similarly, the initialization image for display screen B is mixed with the application interface image for display screen B, and display screen B is control to the initialization image for display screen B and the application interface image for display screen B. When the operating system of the second electronic system starts, the initialization image for display screen C is mixed with the application interface image for display screen C, and display screen C is control to the initialization image for display screen C and the application interface image for display screen C, and the initialization image for display screen D is mixed with the application interface image for display screen D, and display screen D is control to the initialization image for display screen D and the application interface image for display screen D.

In the embodiment of the present disclosure, when the terminal device starts up, the initialization-image combination can be separated to obtain the initialization image for each display screen. The display screens are then controlled to display respective initialization images. Since the initialization-image combination is generated by combining complete initialization images according to the preset splicing rule, when the terminal device separates the initialization-image combination, the initialization image for each display screen remains complete, thus avoiding incomplete images and improving the user experience.

Figure 8:
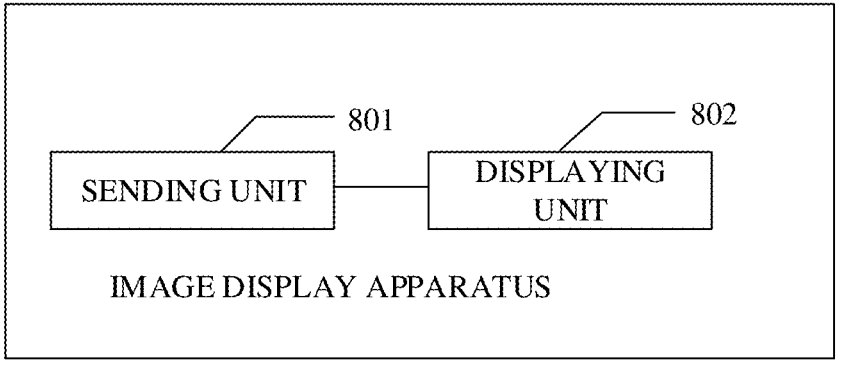
FIG. 8 is a structural diagram of an image display apparatus provided in embodiments of the present disclosure.

Reference is made to FIG. 8, which is a structural diagram of an image display apparatus provided in embodiments of the present disclosure. The apparatus can be a terminal device, an apparatus in the terminal device, or a device capable of being used in cooperation with the terminal device. The image display apparatus illustrated in FIG. 8 includes a sending unit 801 and a displaying unit 802.

The sending unit 801 is configured to send corresponding initialization images to multiple display screens according to an initial image in response to startup of the image display apparatus, where the multiple display screens are from at least two electronic systems. The displaying unit 802 is configured to control each display screen to simultaneously display a corresponding initialization image.

In some possible embodiments, the sending unit 801 configured to send the corresponding initialization images to the multiple display screens according to the initial image is configured to: send the initial image; and separate the initial image to obtain the initialization image for each display screen.

In some possible embodiments, the initial image includes an initialization-image combination.

In some possible embodiments, the sending unit 801 is further configured to: obtain the initialization image for each display screen; and combine the initialization image for each display screen to obtain the initialization-image combination.

In some possible embodiments, the sending unit 801 configured to send the corresponding initialization images to the multiple display screens according to the initial image is configured to: determine an initialization image for each display screen from the initial image; and send the initialization image for each display screen to the respective display screen.

In some possible embodiments, the at least two electronic systems include a first electronic system, the first electronic system includes a first operating system and at least one first display screen, and the multiple display screens include the at least one first display screen, and the displaying unit 802 is further configured to: obtain an application interface image for each first display screen in response to startup of the first operating system; and control each first display screen to display the corresponding application interface image.

In some possible embodiments, the displaying unit 802 configured to obtain the application interface image for each first display screen is configured to: obtain an application-interface-image combination; separate the application-interface-image combination to obtain an application interface image for each display screen; and determine the application interface image for each first display screen from the application interface image for each display screen.

The image display apparatus may be, for example, a chip or a module device. With respect to units included in the apparatuses and products described in the foregoing embodiments, the units may be software units, or may be hardware units, or may partially be software units and partially be hardware units. For example, with regard to various devices and products applied to or integrated in a chip, various units included therein can all be realized by means of hardware, such as a circuit, or at least some units can be realized by means of a software program running on a processor integrated in the chip, and the remaining units (if any) can be realized by means of hardware, such as a circuit. With regard to various devices and products applied to or integrated into a module device, various units included therein can all be realized by means of hardware, such as a circuit. Different units may be located in the same component (such as a chip and a circuit unit) or different components of the module device. Alternatively, at least some units may be realized by means of a software program running on a processor integrated in a module device, and the remaining units (if any) may be realized by means of hardware manner, such as a circuit. With regard to various apparatuses and products applied to or integrated into a terminal device, various units included therein can all be realized by means of hardware, such as a circuit. Different units may be located in the same component (such as a chip and a circuit unit) or different components in the terminal device, Alternatively, at least some of the units may be realized by means of a software program running on a processor integrated inside the terminal device, and the remaining units (if any) may be realized by means of hardware, such as a circuit.

For relevant contents of this embodiment, reference may be made to relevant contents of the foregoing method embodiments, and details are not described herein again. The embodiment of the present disclosure and the above-mention method embodiments are based on the same concept and have the same technical effects. For the specific principle, reference may be made to the description of the method embodiments, and the details are not described herein again.

Figure 9:
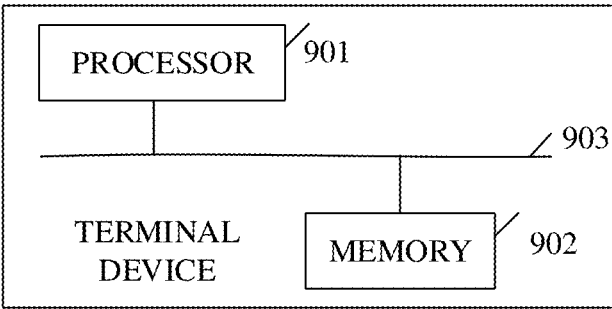
FIG. 9 is a structural diagram of a terminal device provided in embodiments of the present disclosure.

Refer to FIG. 9, where FIG. 9 is a structural diagram of a terminal device provided in embodiments of the present disclosure. The terminal device includes a processor 901 and a memory 902, where the processor 901 and the memory 902 are connected via one or more communication buses 903.

The processor 901 may be a central processing unit (CPU), and the processor may also be a general general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may also be any conventional processor. The processor 901 is configured to support the terminal device to execute corresponding functions of the terminal device in the foregoing image display method.

The memory 902 may include a read-only memory (ROM) and a random access memory (RAM), and provides a computer program and data for the processor 901. A part of the memory 902 may also include non-volatile RAM. The processor 901 is configured to invoke the computer program to send corresponding initialization images to multiple display screens according to an initial image in response to startup of a terminal device, where the multiple display screens are from at least two electronic systems; and control each display screen to simultaneously display a corresponding initialization image.

In some possible embodiments, the processor 901 configured to send the corresponding initialization images to the multiple display screens according to the initial image is configured to: send the initial image; and separate the initial image to obtain the initialization image for each display screen.

In some possible embodiments, the initial image includes an initialization-image combination.

In some possible embodiments, the processor 901 is further configured to: obtain the initialization image for each display screen; and combine the initialization image for each display screen to obtain the initialization-image combination.

In some possible embodiments, the processor 901 configured to send the corresponding initialization images to the multiple display screens according to the initial image is configured to: determine an initialization image for each display screen from the initial image; and send the initialization image for each display screen to the respective display screen.

In some possible embodiments, the at least two electronic systems include a first electronic system, the first electronic system includes a first operating system and at least one first display screen, and the multiple display screens include the at least one first display screen, and the processor 901 is further configured to: obtain an application interface image for each first display screen in response to startup of the first operating system; and control each first display screen to display the corresponding application interface image.

In some possible embodiments, the processor 901 configured to obtain the application interface image for each first display screen is configured to: obtain an application-interface-image combination; separate the application-interface-image combination to obtain an application interface image for each display screen; and determine the application interface image for each first display screen from the application interface image for each display screen.

For relevant contents of this embodiment, reference may be made to relevant contents of the foregoing method embodiments, and details are not described herein again. The embodiment of the present disclosure and the above-mention method embodiments are based on the same concept and have the same technical effects. For the specific principle, reference may be made to the description of the method embodiments, and the details are not described herein again.

A chip is provided in embodiments of the present disclosure. The chip is configured to perform relevant operations performed by the terminal device in the method embodiments. The chip is configured to invoke the computer program to send corresponding initialization images to multiple display screens according to an initial image in response to startup of a chip, where the multiple display screens are from at least two electronic systems; and control each display screen to simultaneously display a corresponding initialization image.

In some possible embodiments, the chip configured to send the corresponding initialization images to the multiple display screens according to the initial image is configured to: send the initial image; and separate the initial image to obtain the initialization image for each display screen.

In some possible embodiments, the initial image includes an initialization-image combination.

In some possible embodiments, the chip is further configured to: obtain the initialization image for each display screen; and combine the initialization image for each display screen to obtain the initialization-image combination.

In some possible embodiments, the chip configured to send the corresponding initialization images to the multiple display screens according to the initial image is configured to: determine an initialization image for each display screen from the initial image; and send the initialization image for each display screen to the respective display screen.

In some possible embodiments, the at least two electronic systems include a first electronic system, the first electronic system includes a first operating system and at least one first display screen, and the multiple display screens include the at least one first display screen, and the processor 901 is further configured to: obtain an application interface image for each first display screen in response to startup of the first operating system; and control each first display screen to display the corresponding application interface image.

In some possible embodiments, the processor 901 configured to obtain the application interface image for each first display screen is configured to: obtain an application-interface-image combination; separate the application-interface-image combination to obtain an application interface image for each display screen; and determine the application interface For relevant contents of this embodiment, reference may be made to relevant contents of the foregoing method embodiments, and details are not described herein again.

The embodiment of the present disclosure and the above-mention method embodiments are based on the same concept and have the same technical effects. For the specific principle, reference may be made to the description of the method embodiments, and the details are not described herein again.

A module device is further provided in embodiments of the present disclosure. The module device includes a processor and a communication interface. The processor is connected to the communication interface. The communication interface is configured to send and receive a signal. The processor is configured to invoke the computer program to send corresponding initialization images to multiple display screens according to an initial image in response to startup of the module device, where the multiple display screens are from at least two electronic systems; and control each display screen to simultaneously display a corresponding initialization image.

In some possible embodiments, the processor configured to send the corresponding initialization images to the multiple display screens according to the initial image is configured to: send the initial image; and separate the initial image to obtain the initialization image for each display screen.

In some possible embodiments, the initial image includes an initialization-image combination.

In some possible embodiments, the processor 901 is further configured to: obtain the initialization image for each display screen; and combine the initialization image for each display screen to obtain the initialization-image combination.

In some possible embodiments, the processor 901 configured to send the corresponding initialization images to the multiple display screens according to the initial image is configured to: determine an initialization image for each display screen from the initial image; and send the initialization image for each display screen to the respective display screen.

In some possible embodiments, the at least two electronic systems include a first electronic system, the first electronic system includes a first operating system and at least one first display screen, and the multiple display screens include the at least one first display screen, and the processor 901 is further configured to: obtain an application interface image for each first display screen in response to startup of the first operating system; and control each first display screen to display the corresponding application interface image.

In some possible embodiments, the processor 901 configured to obtain the application interface image for each first display screen is configured to: obtain an application-interface-image combination; separate the application-interface-image combination to obtain an application interface image for each display screen; and determine the application interface image for each first display screen from the application interface image for each display screen.

For relevant contents of this embodiment, reference may be made to relevant contents of the foregoing method embodiments, and details are not described herein again. The embodiment of the present disclosure and the above-mention method embodiments are based on the same concept and have the same technical effects. For the specific principle, reference may be made to the description of the method embodiments, and the details are not described herein again.

A non-transitory computer-readable storage medium is provided in embodiments of the disclosure. The storage medium stores a computer program, when executed by a processor, the image display method described in embodiments of the present disclosure may be implemented, which will not be repeated herein.

The computer-readable storage medium may be an internal storage unit of the terminal device described in any of the foregoing embodiments, such as a hard disk or a memory of the device. The computer-readable storage medium may also be an external storage device, such as a plug-in hard disk, a smart media card (SMC), a secure digital (SD) card, a flash card, or the like provided to the device. Further, the computer-readable storage medium may further include an internal storage unit and an external storage device. The computer readable storage medium may be configured to store the computer programs and other programs and data required by a terminal. The computer readable storage medium may be further configured to temporarily store data that has been output or will be output.

Those of ordinary skill in the art can understand that all or part of the processes in the methods of the above embodiments can be implemented by instructing relevant hardware through a computer program, and the program can be stored in a computer-readable storage medium. During execution, the processes of the embodiments of the above-mentioned methods may be included. The storage medium may be a magnetic disk, an optical disk, a read-only memory (ROM), or a random access memory (RAM) or the like.

The above disclosure is only some embodiments of the disclosure, and certainly cannot limit the scope of the disclosure. Therefore, the equivalent changes made according to the claims of the disclosure are still within the scope of the disclosure.

What is claimed is:

1. An image display method, performed by a terminal device and comprising:

combining an initialization image for each display screen of a plurality of display screens in response to the terminal device being in an offline state, to obtain an initialization-image combination;

sending the initialization-image combination to the plurality of display screens in response to startup of the terminal device, wherein the plurality of display screens are from at least two different electronic systems, and each electronic system of the at least two different electronic systems comprises an operating system and at least one display screen; and controlling each display screen to simultaneously display a corresponding initialization image, before startup of operating systems of the at least two electronic systems, wherein in response to existence of at least two display screens belonging to a same electronic system among the plurality of display screens, combining the initialization image for each display screen to obtain the initialization-image combination comprises:

serializing initialization images for the at least two display screens to obtain an initialization image for the same electronic system, and combining the initialization image for the same electronic system and initialization images for other display screens among the plurality of display screens excluding the at least two display screens, to obtain the initialization-image combination; and sending the initialization-image combination to the plurality of display screens comprises:

separating the initialization-image combination to obtain the initialization image for the same electronic system and the initialization images for other display screens among the plurality of display screens excluding the at least two display screens; and de-serializing the initialization image for the same electronic system to obtain the initialization images for the at least two display screens of the same electronic system.

2. The method of claim 1, wherein sending the initialization images to the plurality of display screens according to the initialization-image combination comprises:

sending the initialization-image combination; and separating the initialization-image combination to obtain the corresponding initialization image for each display screen.

3. The method of claim 1, wherein sending the initialization-image combination to the plurality of display screens comprises:

sending the initialization-image combination through a direct connection port between the terminal device and the plurality of display screens in response to the presence of the direct connection port; and separating the initialization-image combination to obtain the initialization image for each display screen.

4. The method of claim 1, wherein the at least two electronic systems comprise a first electronic system, the first electronic system comprises a first operating system and at least one first display screen, and the plurality of display screens comprise the at least one first display screen, and the method further comprises:

obtaining an application interface image for each first display screen in response to startup of the first operating system; and controlling each first display screen to display the application interface image.

5. The method of claim 4, wherein obtaining the application interface image for each first display screen comprises:

obtaining an application-interface-image combination;

separating the application-interface-image combination to obtain an application interface image for each display screen of the plurality of display screens; and determining the application interface image for each first display screen from the application interface image for each display screen.

6. A terminal device, comprising a processor and a memory, wherein the processor is connected to the memory, and the memory is configured to store a computer program, the computer program comprises program instructions, and the processor is configured to invoke the program instructions to:

combine an initialization image for each of a plurality of display screens in response to the terminal device being in an offline state, to obtain an initialization-image combination;

send the initialization-image combination to the plurality of display screens according to the initialization-image combination in response to startup of the terminal device, wherein the plurality of display screens are from at least two different electronic systems, and each electronic system of the at least two different electronic systems comprises an operating system and at least one display screen; and control each display screen to simultaneously display a corresponding initialization image, before startup of operating systems of the at least two electronic systems, wherein in response to existence of at least two display screens belonging to a same electronic system among the plurality of display screens, in terms of combining the initialization image for each display screen to obtain the initialization-image combination, the processor is configured to invoke the program instructions to:

serialize initialization images for the at least two display screens to obtain an initialization image for the same electronic system, and combine the initialization image for the same electronic system and initialization images for other display screens among the plurality of display screens excluding the at least two display screens, to obtain the initialization-image combination; and in terms of sending the initialization-image combination to the plurality of display screens, the processor is configured to invoke the program instructions to:

separate the initialization-image combination to obtain the initialization image for the same electronic system and the initialization images for other display screens among the plurality of display screens excluding the at least two display screens; and de-serialize the initialization image for the same electronic system to obtain the initialization images for the at least two display screens of the same electronic system.

7. The terminal device of claim 6, wherein in terms of sending the initialization images to the plurality of display screens according to the initialization-image combination, the processor is configured to invoke the program instructions to:

send the initialization-image combination; and separate the initialization-image combination to obtain the corresponding initialization image for each display screen.

8. A non-transitory computer-readable storage medium, wherein the computer-readable storage medium stores a computer program, the computer program includes program instructions which, when executed by a processor of a terminal device, cause the processor to:

combine an initialization image for each of a plurality of display screens in response to the terminal device being in an offline state, to obtain an initialization-image combination;

send initialization-image combination to the plurality of display screens according to the initialization-image combination in response to startup of the terminal device, wherein the initialization-image combination is obtained by combining the initialization image for each display screen in response to the terminal device being in an offline state, the plurality of display screens are from at least two different electronic systems, and each electronic system of the at least two different electronic systems comprises an operating system and at least one display screen; and controlling each display screen to simultaneously display a corresponding initialization image, before startup of operating systems of the at least two electronic systems, wherein in response to existence of at least two display screens belonging to a same electronic system among the plurality of display screens, in terms of combining the initialization image for each display screen to obtain the initialization-image combination, the processor is caused to:

serialize initialization images for the at least two display screens to obtain an initialization image for the same electronic system, and combine the initialization image for the same electronic system and initialization images for other display screens among the plurality of display screens excluding the at least two display screens, to obtain the initialization-image combination; and in terms of sending the initialization-image combination to the plurality of display screens, the processor is caused to:

separate the initialization-image combination to obtain the initialization image for the same electronic system and the initialization images for other display screens among the plurality of display screens excluding the at least two display screens; and de-serialize the initialization image for the same electronic system to obtain the initialization images for the at least two display screens of the same electronic system.

9. The non-transitory computer-readable storage medium of claim 8, wherein the at least two electronic systems comprise a first electronic system, the first electronic system comprises a first operating system and at least one first display screen, and the plurality of display screens comprise the at least one first display screen, and the computer program includes program instructions which further cause the processor to:

obtain an application interface image for each first display screen in response to startup of the first operating system; and control each first display screen to display the application interface image.

10. The non-transitory computer-readable storage medium of claim 9, wherein in terms of obtaining the application interface image for each first display screen, the computer program includes program instructions which further cause the processor to:

obtain an application-interface-image combination;

separate the application-interface-image combination to obtain an application interface image for each display screen of the plurality of display screens; and determine the application interface image for each first display screen from the application interface image for each display screen.

* * * * *